Patented May 10, 1949

2,469,584

UNITED STATES PATENT OFFICE 2,469,584

DIELECTRIC COMPOSITION AND METHOD
OF MAKING SAME

Eugene Wainer, Niagara Falls, and Allen N. Salomon, Malone, N. Y., assignors, by mesne assignments, to National Lead Company, New York, N. Y., a corporation of New Jersey No Drawing. Application September 11, 1945,
Serial No. 615,701

16 Claims. (Cl. 106—39)

This invention relates to ceramic dielectric materials and to methods of making the same. More particularly, it relates to dielectric materials in which the alkaline earth titanates are the predominating constituent, said alkaline earth titanates being fluxed with small amounts of manganese dioxides.

In previous applications, Serial No. 465,387, now Patent No. 2,467,169, filed November 12, 1942, and Serial No. 482,613, filed April 10, 1943, now Patent No. 2,420,692, granted May 20, 1947, the useful properties of the alkaline earth titanates and mixtures of these titanates for electrical use were detailed. They are used as radio capacitors, temperature compensators, wave guides and the like, in electromechanical devices, etc. They are particularly useful because of the extremely high dielectric constants they develop coupled with low power factors and good leakage resistances.

Most of these products are relatively pure compounds and are formed ceramically. Their firing temperatures are relatively high and difficulty is experienced in finding a flux which is not only an aid ceramically but which will not reduce the quality of the electrical properties of the final product. We have found that the addition of a very small quantity of manganese dioxide to these titanates and mixtures thereof, not only serves as an excellent flux ceramically but is unique in that its use actually improves the electrical characteristics generally of the final product, increasing the available dielectric constant and lowering the power factor along with some reduction in firing temperature. To this end, therefore, the effect of manganese dioxide may be considered unique.

In the practice of our invention we use the ceramically prepared alkaline earth titanates as the basic materials. Generally these are the titanates of calcium, strontium, and barium and mixtures thereof, particularly certain barium-strontium titanates. As the source of manganese we prefer to use chemically prepared manganese dioxide though very pure pyrolusite mineral of about 96% $MnO_2$ content is also suitable.

The finely ground ingredients, as indicated in the table below, are thoroughly mixed in and the damp powder is granulated by passage through a 20 mesh screen. The granulated mixture is pressed into standard one-inch disc capacitors about one-tenth inch thick at 4000 pounds per square inch and dried, and then fired to the temperatures indicated in the table, holding at maturation temperature for 3 hours. After cooling, silver electrodes are applied at opposite sides of the disc and the electrical characteristics measured at the designated radio frequencies.

In the following table are presented the data obtained by addition of about 0.05% to 1% $MnO_2$ to special compositions of the titanates of the alkaline earth metals at temperatures from 2350° F. to 2550° F. Such addition permits the formation of non-porous dielectric materials at temperatures below that at which ceramic union occurs without the presence of manganese dioxide. Although complete data is given herein for the electrical characteristics of certain special mixes of titanates, addition of manganese dioxide to all ranges of mixtures of titanates, or to individual titanates alone, lowers the firing temperature required to produce the ceramic and improves the electrical properties.

TABLE

*Example I*

| | Parts of Titanate | Parts $MnO_2$ | Firing Temp. | 1 Megacycle | |
|---|---|---|---|---|---|
| | | | | Dielectric Constant | Power Factor |
| | | | °F. | | Percent |
| 1 | 65 $BaTiO_3$, 35 $SrTiO_3$ | -------- | 2,350 | porous | porous |
| 2 | ----do---- | -------- | 2,450 | porous | porous |
| 3 | ----do---- | -------- | 2,550 | 3,090 | 0.51 |
| 4 | ----do---- | 0.05 | 2,350 | 2,590 | 0.34 |
| 5 | ----do---- | 0.05 | 2,450 | 3,530 | 0.24 |
| 6 | ----do---- | 0.05 | 2,550 | 3,460 | 0.13 |
| 7 | ----do---- | 0.10 | 2,350 | 2,640 | 0.32 |
| 8 | ----do---- | 0.10 | 2,450 | 3,570 | 0.22 |
| 9 | ----do---- | 0.10 | 2,550 | 3,690 | 0.29 |
| 10 | ----do---- | 0.30 | 2,350 | 2,820 | 0.32 |
| 11 | ----do---- | 0.30 | 2,450 | 3,380 | 0.34 |
| 12 | ----do---- | 0.30 | 2,550 | 3,390 | 0.22 |
| 13 | ----do---- | 0.50 | 2,350 | 2,820 | 0.29 |
| 14 | ----do---- | 0.50 | 2,450 | 3,010 | 0.42 |
| 15 | ----do---- | 0.50 | 2,550 | 3,050 | 0.57 |
| 16 | ----do---- | 1.00 | 2,350 | 2,605 | 0.29 |
| 17 | ----do---- | 1.00 | 2,450 | 2,570 | 0.32 |
| 18 | ----do---- | 1.00 | 2,550 | 2,430 | 0.34 |

*Example II*

| | Parts of Titanate | Parts $MnO_2$ | Firing Temp. | 1 Megacycle | |
|---|---|---|---|---|---|
| | | | | Dielectric Constant | Power Factor |
| | | | °F. | | Percent |
| 19 | 69 $BaTiO_3$, 31 $SrTiO_3$ | -------- | 2,350 | porous | porous |
| 20 | ----do---- | -------- | 2,450 | porous | porous |
| 21 | ----do---- | -------- | 2,550 | 4,420 | 0.68 |
| 22 | ----do---- | 0.05 | 2,350 | porous | porous |
| 23 | ----do---- | 0.05 | 2,450 | porous | porous |
| 24 | ----do---- | 0.05 | 2,550 | 5,710 | 0.51 |
| 25 | ----do---- | 0.10 | 2,350 | porous | porous |
| 26 | ----do---- | 0.10 | 2,450 | porous | porous |
| 27 | ----do---- | 0.10 | 2,550 | 6,480 | 0.48 |
| 28 | ----do---- | 0.30 | 2,350 | 3,730 | 0.39 |
| 29 | ----do---- | 0.30 | 2,450 | 4,590 | 0.47 |
| 30 | ----do---- | 0.30 | 2,550 | 5,480 | 0.35 |
| 31 | ----do---- | 0.5 | 2,350 | 3,560 | 0.37 |
| 32 | ----do---- | 0.5 | 2,450 | 4,480 | 0.44 |
| 33 | ----do---- | 0.5 | 2,550 | 4,800 | 0.53 |
| 34 | ----do---- | 1.0 | 2,350 | 3,140 | 0.27 |
| 35 | ----do---- | 1.0 | 2,450 | 3,520 | 0.36 |
| 36 | ----do---- | 1.0 | 2,550 | 3,670 | 0.51 |

Example III

| | Parts of Titanate | Parts MnO$_2$ | Firing Temp. | 1 Megacycle | |
|---|---|---|---|---|---|
| | | | | Dielectric Constant | Power Factor |
| | | | °F. | | Percent |
| 37 | 71 BaTiO$_3$, 29 SrTiO$_3$ | -------- | 2,350 | porous | porous |
| 38 | ----do---- | -------- | 2,450 | porous | porous |
| 39 | ----do---- | -------- | 2,550 | 4,460 | 0.49 |
| 40 | ----do---- | 0.05 | 2,350 | 2,760 | 0.77 |
| 41 | ----do---- | 0.05 | 2,450 | 4,360 | 0.77 |
| 42 | ----do---- | 0.05 | 2,550 | 4,540 | 0.76 |
| 43 | ----do---- | 0.10 | 2,350 | 2,790 | 0.65 |
| 44 | ----do---- | 0.10 | 2,450 | 4,440 | 0.76 |
| 45 | ----do---- | 0.10 | 2,550 | 4,560 | 0.75 |
| 46 | ----do---- | 0.30 | 2,350 | 2,750 | 0.41 |
| 47 | ----do---- | 0.30 | 2,450 | 5,030 | 0.48 |
| 48 | ----do---- | 0.30 | 2,550 | 4,890 | 0.47 |
| 49 | ----do---- | 0.50 | 2,350 | 2,670 | 0.44 |
| 50 | ----do---- | 0.50 | 2,450 | 5,070 | 0.49 |
| 51 | ----do---- | 0.50 | 2,550 | 4,520 | 0.50 |
| 52 | ----do---- | 1.00 | 2,350 | 2,330 | 0.45 |
| 53 | ----do---- | 1.00 | 2,450 | 4,030 | 0.45 |
| 54 | ----do---- | 1.00 | 2,550 | 2,000 | 0.97 |

Example IV

| | Parts of Titanate | Parts MnO$_2$ | Firing Temp. | 1 Megacycle | |
|---|---|---|---|---|---|
| | | | | Dielectric Constant | Power Factor |
| | | | °F. | | Percent |
| 55 | 73 BaTiO$_3$, 27 SrTiO$_3$ | -------- | 2,350 | porous | porous |
| 56 | ----do---- | -------- | 2,450 | 2,160 | 0.70 |
| 57 | ----do---- | -------- | 2,550 | 3,060 | 0.58 |
| 58 | ----do---- | 0.05 | 2,350 | 2,000 | 0.97 |
| 59 | ----do---- | 0.05 | 2,450 | 3,490 | 0.75 |
| 60 | ----do---- | 0.05 | 2,550 | 3,460 | 0.75 |
| 61 | ----do---- | 0.1 | 2,350 | 2,200 | 0.91 |
| 62 | ----do---- | 0.1 | 2,450 | 3,610 | 0.82 |
| 63 | ----do---- | 0.1 | 2,550 | 3,650 | 0.69 |
| 64 | ----do---- | 0.3 | 2,350 | 2,150 | 0.71 |
| 65 | ----do---- | 0.3 | 2,450 | 3,970 | 0.62 |
| 66 | ----do---- | 0.3 | 2,550 | 3,810 | 0.52 |
| 67 | ----do---- | 0.5 | 2,350 | 2,090 | 0.57 |
| 68 | ----do---- | 0.5 | 2,450 | 3,960 | 0.71 |
| 69 | ----do---- | 0.5 | 2,550 | 4,030 | 0.77 |
| 70 | ----do---- | 1.0 | 2,350 | 2,180 | 0.70 |
| 71 | ----do---- | 1.0 | 2,450 | 3,710 | 0.94 |
| 72 | ----do---- | 1.0 | 2,550 | 4,160 | 0.95 |

Example V

| | Parts of Titanate | Parts MnO$_2$ | Firing Temp. | 1 Megacycle | |
|---|---|---|---|---|---|
| | | | | Dielectric Constant | Power Factor |
| | | | °F. | | Percent |
| 73 | 75 BaTiO$_3$, 25 SrTiO$_3$ | -------- | 2,350 | porous | porous |
| 74 | ----do---- | -------- | 2,450 | porous | porous |
| 75 | ----do---- | -------- | 2,550 | 2,250 | 0.72 |
| 76 | ----do---- | 0.05 | 2,350 | porous | porous |
| 77 | ----do---- | 0.05 | 2,450 | 2,150 | 1.15 |
| 78 | ----do---- | 0.05 | 2,550 | 2,010 | 0.93 |
| 79 | ----do---- | 0.1 | 2,350 | porous | porous |
| 80 | ----do---- | 0.1 | 2,450 | 2,260 | 1.14 |
| 81 | ----do---- | 0.1 | 2,550 | 2,110 | 0.92 |
| 82 | ----do---- | 0.3 | 2,350 | 2,640 | 0.64 |
| 83 | ----do---- | 0.3 | 2,450 | 2,600 | 0.85 |
| 84 | ----do---- | 0.3 | 2,550 | 2,410 | 0.72 |
| 85 | ----do---- | 0.5 | 2,350 | 2,810 | 0.57 |
| 86 | ----do---- | 0.5 | 2,450 | 2,630 | 0.75 |
| 87 | ----do---- | 0.5 | 2,550 | 2,640 | 0.74 |
| 88 | ----do---- | 1.0 | 2,350 | 2,850 | 0.49 |
| 89 | ----do---- | 1.0 | 2,450 | 3,380 | 0.54 |
| 90 | ----do---- | 1.0 | 2,550 | 2,960 | 0.51 |

Example VI

| | Parts of Titanate | Parts MnO$_2$ | Firing Temp. | 1 Megacycle | |
|---|---|---|---|---|---|
| | | | | Dielectric Constant | Power Factor |
| | | | °F. | | Percent |
| 91 | BaTiO$_3$, good grade | -------- | 2,350 | porous | porous |
| 92 | ----do---- | -------- | 2,450 | 1,520 | 0.93 |
| 93 | ----do---- | -------- | 2,550 | 1,600 | 0.89 |
| 94 | ----do---- | 0.05 | 2,350 | porous | porous |
| 95 | ----do---- | 0.05 | 2,450 | 1,560 | 1.18 |
| 96 | ----do---- | 0.05 | 2,550 | 1,710 | 1.31 |
| 97 | ----do---- | 0.10 | 2,350 | porous | porous |
| 98 | ----do---- | 0.1 | 2,450 | 1,680 | 1.37 |
| 99 | ----do---- | 0.1 | 2,550 | 1,740 | 1.38 |
| 100 | ----do---- | 0.3 | 2,350 | porous | porous |
| 101 | ----do---- | 0.3 | 2,450 | 1,450 | 0.90 |
| 102 | ----do---- | 0.3 | 2,550 | 1,700 | 1.20 |
| 103 | ----do---- | 0.5 | 2,350 | porous | porous |
| 104 | ----do---- | 0.5 | 2,450 | 1,520 | 0.92 |
| 105 | ----do---- | 0.5 | 2,550 | 1,720 | 1.05 |
| 106 | ----do---- | 1.0 | 2,350 | porous | porous |
| 107 | ----do---- | 1.0 | 2,450 | 1,505 | 0.62 |
| 108 | ----do---- | 1.0 | 2,550 | 1,710 | 1.35 |

Example VII

| | Parts of Titanate | Parts MnO$_2$ | Firing Temp. | 1 Megacycle | |
|---|---|---|---|---|---|
| | | | | Dielectric Constant | Power Factor |
| | | | °F. | | Percent |
| 109 | BaTiO$_3$, poor grade | -------- | 2,350 | 957 | 0.57 |
| 110 | ----do---- | -------- | 2,450 | 1,100 | 0.57 |
| 111 | ----do---- | -------- | 2,550 | 1,140 | 0.64 |
| 112 | ----do---- | 0.05 | 2,350 | 1,030 | 0.60 |
| 113 | ----do---- | 0.05 | 2,450 | 1,130 | 0.67 |
| 114 | ----do---- | 0.05 | 2,550 | 1,240 | 0.81 |
| 115 | ----do---- | 0.1 | 2,350 | 1,050 | 0.63 |
| 116 | ----do---- | 0.1 | 2,450 | 1,155 | 0.65 |
| 117 | ----do---- | 0.1 | 2,550 | 1,230 | 0.84 |
| 118 | ----do---- | 0.3 | 2,350 | 1,137 | 0.89 |
| 119 | ----do---- | 0.3 | 2,450 | 1,312 | 0.91 |
| 120 | ----do---- | 0.3 | 2,550 | 1,375 | 1.19 |
| 121 | ----do---- | 0.5 | 2,350 | 1,130 | 1.02 |
| 122 | ----do---- | 0.5 | 2,450 | 1,270 | 1.00 |
| 123 | ----do---- | 0.5 | 2,550 | 1,320 | 1.24 |
| 124 | ----do---- | 1.0 | 2,350 | 1,110 | 0.98 |
| 125 | ----do---- | 1.0 | 2,450 | 1,200 | 0.97 |
| 126 | ----do---- | 1.0 | 2,550 | 1,220 | 1.02 |

Example VIII

| | Parts of Titanate | Parts MnO$_2$ | Firing Temp. | 1 Megacycle | |
|---|---|---|---|---|---|
| | | | | Dielectric Constant | Power Factor |
| | | | °F. | | Percent |
| 127 | CaTiO$_3$ | -------- | 2,350 | porous | porous |
| 128 | ----do---- | -------- | 2,450 | 159 | 0.021 |
| 129 | ----do---- | -------- | 2,550 | 156 | 0.027 |
| 130 | ----do---- | 0.05 | 2,350 | porous | porous |
| 131 | ----do---- | 0.05 | 2,450 | 165 | 0.018 |
| 132 | ----do---- | 0.05 | 2,550 | 167 | 0.018 |
| 133 | ----do---- | 0.1 | 2,350 | porous | porous |
| 134 | ----do---- | 0.1 | 2,450 | 154 | 0.018 |
| 135 | ----do---- | 0.1 | 2,550 | 159 | 0.015 |
| 136 | ----do---- | 0.3 | 2,350 | porous | porous |
| 137 | ----do---- | 0.3 | 2,450 | 156 | 0.027 |
| 138 | ----do---- | 0.3 | 2,550 | 161 | 0.019 |
| 139 | ----do---- | 0.5 | 2,350 | porous | porous |
| 140 | ----do---- | 0.5 | 2,450 | 160 | 0.031 |
| 141 | ----do---- | 0.5 | 2,550 | 169 | 0.028 |
| 142 | ----do---- | 1.0 | 2,350 | porous | porous |
| 143 | ----do---- | 1.0 | 2,450 | 163 | 0.053 |
| 144 | ----do---- | 1.0 | 2,550 | 165 | 0.057 |

Example IX

| Parts of Titanate | Parts MnO$_2$ | Firing Temp. | 1 Megacycle Dielectric Constant | 1 Megacycle Power Factor |
|---|---|---|---|---|
| | | °F. | | Percent |
| 145 SrTiO$_3$ | | 2,350 | porous | porous |
| 146 ----do---- | | 2,450 | 230 | 0.08 |
| 147 ----do---- | | 2,550 | 244 | 0.04 |
| 148 ----do---- | 0.05 | 2,350 | porous | porous |
| 149 ----do---- | 0.05 | 2,450 | 272 | 0.03 |
| 150 ----do---- | 0.05 | 2,550 | 264 | 0.02 |
| 151 ----do---- | 0.10 | 2,350 | porous | porous |
| 152 ----do---- | 0.1 | 2,450 | 254 | 0.04 |
| 153 ----do---- | 0.1 | 2,550 | 252 | 0.03 |
| 154 ----do---- | 0.3 | 2,350 | porous | porous |
| 155 ----do---- | 0.3 | 2,450 | 273 | 0.03 |
| 156 ----do---- | 0.3 | 2,550 | 252 | 0.04 |
| 157 ----do---- | 0.5 | 2,350 | porous | porous |
| 158 ----do---- | 0.5 | 2,450 | 269 | 0.08 |
| 159 ----do---- | 0.5 | 2,550 | 261 | 0.04 |
| 160 ----do---- | 1.0 | 2,350 | 244 | 0.04 |
| 161 ----do---- | 1.0 | 2,450 | 272 | 0.04 |
| 162 ----do---- | 1.0 | 2,550 | 258 | 0.03 |

The same general benefits may be derived by adding manganese dioxide in proper amounts to the raw batch used in preparation of the titanate. In such case, the respective alkaline earth carbonate, titanium dioxide, and the requisite amount of MNO$_2$ are calcined together, milled to a fine powder, and dried. The prefired, completely prepared composition is then prepared into test capacitors in the same fashion as explained above.

Whereas in the table the results obtained by adding MNO$_2$ to a fired ceramic powder are detailed, in the following examples the effect of the addition of MnO$_2$ to the raw batch is given.

Example X

| A | Grams | B | Grams |
|---|---|---|---|
| BaCO$_3$ | 197 | BaCO$_3$ | 197 |
| TiO$_2$ | 80 | TiO$_2$ | 80 |
| | | MnO$_2$ | 0.233 |

The above mixes were prepared separately, thoroughly blended, calcined 3 hours at 2250° F., wet milled through 325 mesh, dried, and standard ceramic test bodies prepared therefrom and tested as before.

The following electrical results were obtained after firing at 2450° F.

| | Dielectric Constant | Power Factor |
|---|---|---|
| | | Percent |
| A | 1,004 | 0.47 |
| B | 1,242 | 0.54 |

Example XI

| A | Grams | B | Grams |
|---|---|---|---|
| SrCO$_3$ | 146 | SrCO$_3$ | 146 |
| TiO$_2$ | 80 | TiO$_2$ | 80 |
| | | MnO$_2$ | 0.183 |

These were prepared in the same fashion as the BaTiO$_2$ in Example X.

The electrical results obtained were as follows (after firing at 2450° F.):

| | Dielectric Constant | Power Factor |
|---|---|---|
| | | Per cent |
| A | 230 | 0.06 |
| B | 264 | 0.03 |

Example XII

| A | Grams | B | Grams |
|---|---|---|---|
| CaCO$_3$ | 99 | CaCO$_3$ | 99 |
| TiO$_2$ | 80 | TiO$_2$ | 80 |
| | | MnO$_2$ | 0.136 |

These were prepared in the same fashion as the BaTiO$_3$ in Example X.

The electrical results obtained after firing the test pieces at 2450° F. were as follows:

| | Dielectric Constant | Power Factor |
|---|---|---|
| | | Per cent |
| A | 154 | 0.03 |
| B | 165 | 0.02 |

Example XIII

| A | Grams | B | Grams |
|---|---|---|---|
| BaCO$_3$ | 58.60 | BaCO$_3$ | 58.60 |
| SrCO$_3$ | 24.50 | SrCO$_3$ | 24.50 |
| TiO$_2$ | 37.15 | TiO$_2$ | 37.15 |
| | | MnO$_2$ | 0.10 |

These were prepared as indicated in the preceding examples. The ceramic test capacitors prepared therefrom were fired at 2550° F. The electrical results obtained at 1 megacycle were as follows:

| | Dielectric Constant | Power Factor |
|---|---|---|
| | | Per cent |
| A | 4,610 | 0.72 |
| B | 6,260 | 0.49 |

It will be understood that the foregoing examples are merely illustrative of the principles of the invention and are not deemed limitative thereof. An infinite number of mixes of the titanates is available and addition of a small quantity of manganese dioxide to either the individual titanate or mixtures of titanates will be found to be beneficial.

What is claimed is:

1. The ceramic dielectric consisting of an alkaline earth metal titanate and from 0.05% to 1% by weight of manganese dioxide.

2. A ceramic dielectric consisting of barium titanate and from 0.05% to 1% by weight of manganese dioxide.

3. A ceramic dielectric consisting of strontium titanate and from 0.05% to 1% by weight of manganese dioxide.

4. A ceramic dielectric consisting of calcium titanate and from 0.05% to 1% by weight of manganese dioxide.

5. A ceramic dielectric consisting of a mixture of alkaline earth titanates and from 0.05% to 1% by weight of manganese dioxide.

6. A ceramic dielectric consisting of a mixture of barium titanate, another alkaline earth metal titanate and from 0.05% to 1% by weight of manganese dioxide.

7. A ceramic dielectric consisting of a mixture of strontium titanate, another alkaline earth metal titanate and from 0.05% to 1% by weight of manganese dioxide.

8. A ceramic dielectric consisting of a mixture of calcium titanate, another alkaline earth metal titanate and from 0.05% to 1% by weight of manganese dioxide.

9. A method of manufacturing a ceramic dielectric which comprises firing a mixture consisting of an alkaline earth metal titanate with from 0.05% to 1% by weight of manganese dioxide at a temperature within the range 2350° F. to 2550° F.

10. A method of manufacturing a ceramic dielectric which comprises firing a mixture consisting of barium titanate with from 0.05% to 1% by weight of manganese dioxide at a temperature within the range 2350° F. to 2550° F.

11. A method of manufacturing a ceramic dielectric which comprises firing a mixture consisting of strontium titanate with from 0.05% to 1% by weight of manganese dioxide at a temperature within the range 2350° F. to 2550° F.

12. A method of manufacturing a ceramic dielectric which comprises firing a mixture consisting of calcium titanate with from 0.05% to 1% by weight of manganese dioxide at a temperature within the range 2350° F. to 2550° F.

13. A method of manufacturing a ceramic dielectric which comprises firing a mixture consisting of alkaline earth metal titanates with from 0.05% to 1% by weight of manganese dioxide at a temperature within the range 2350° F. to 2550° F.

14. A method of manufacturing a ceramic dielectric which comprises firing a mixture consisting of barium titanate and another alkaline earth metal titanate with from 0.05% to 1% by weight of manganese dioxide at a temperature within the range 2350° F. to 2550° F.

15. A method of manufacturing a ceramic dielectric which comprises firing a mixture consisting of strontium titanate and another alkaline earth metal titanate with from 0.05% to 1% by weight of manganese dioxide at a temperature within the range 2350° F. to 2550° F.

16. A method of manufacturing a ceramic dielectric which comprises firing a mixture consisting of calcium titanate and another alkaline earth metal titanate with from 0.05% to 1% by weight of manganese dioxide at a temperature within the range 2350° F. to 2550° F.

EUGENE WAINER.
ALLEN N. SALOMON.

REFERENCES CITED

The following references are of record in the file of this patent:

UNITED STATES PATENTS

| Number | Name | Date |
|---|---|---|
| 2,215,478 | Rath et al. | Sept. 24, 1940 |
| 2,220,765 | Hirose et al. | Nov. 5, 1940 |

FOREIGN PATENTS

| Number | Country | Date |
|---|---|---|
| 396,532 | Great Britain | 1933 |
| 588,271 | Germany | 1933 |
| 445,495 | Great Britain | 1936 |

Certificate of Correction

Patent No. 2,469,584.  May 10, 1949.

EUGENE WAINER ET AL.

It is hereby certified that error appears in the printed specification of the above numbered patent requiring correction as follows:

Column 6, line 49, claim 1, for the words "The ceramic" read *A ceramic*;

and that the said Letters Patent should be read with this correction therein that the same may conform to the record of the case in the Patent Office.

Signed and sealed this 1st day of November, A. D. 1949.

[SEAL]

THOMAS F. MURPHY,
*Assistant Commissioner of Patents.*